United States Patent [19]
Backhurst et al.

[11] 3,879,225
[45] Apr. 22, 1975

[54] ELECTROCHEMICAL CELLS COMPRISING FLUIDIZED BED ELECTRODES

[75] Inventors: John Rayner Backhurst, Allendale; Francis Goodridge; Raymond Ernest Plimley, both of Newcastle-upon-Tyne; Martin Fleischmann, Chandlersford, all of England

[73] Assignee: National Research Development Corporation, London, England

[22] Filed: May 2, 1973

[21] Appl. No.: 356,376

Related U.S. Application Data

[63] Continuation of Ser. No. 803,166, Feb. 28, 1969, abandoned.

[30] Foreign Application Priority Data
Mar. 6, 1968  United Kingdom............... 10923/68

[52] U.S. Cl............. 136/86 D; 136/86 R; 204/280
[51] Int. Cl........................................... H01m 27/04
[58] Field of Search.......... 136/86 R; 204/252, 275, 204/277, 280; 210/20; 209/140, 141; 75/26, 29; 23/1 F

[56] References Cited
UNITED STATES PATENTS

| | | | |
|---|---|---|---|
| 2,948,587 | 8/1960 | Johnson et al........................ | 23/87 |
| 3,053,648 | 9/1962 | Stephens et al....................... | 75/26 |
| 3,135,674 | 6/1964 | Ruetschi............................ | 204/151 |
| 3,510,354 | 5/1970 | Hess et al........................... | 136/86 R |

*Primary Examiner*—John H. Mack
*Assistant Examiner*—H. A. Feeley
*Attorney, Agent, or Firm*—Kemon, Palmer & Estabrook

[57] ABSTRACT

An electrode arrangement for an electrochemical cell comprises an electrode chamber having one side wall which is at least in part a permeable or semi-permeable diaphragm and containing a bed of conducting or semi-conducting particles which in use of the cell are caused to be acted upon by an upwardly flowing liquid to form a fluidized bed of particles, the flow being substantially uniform over horizontal cross-sections of the electrode chamber, and in order to achieve substantially uniform upward flow of liquid a bottom portion is provided for said chamber which is tapered downwardly and a thin horizontal slot enters the side of the taper to enable said liquid to be passed to the electrode chamber and at the same time substantially to prevent the particles from passing out of the electrode chamber when the upward flow of the liquid ceases.

8 Claims, 2 Drawing Figures

ELECTROCHEMICAL CELLS COMPRISING FLUIDIZED BED ELECTRODES

This application is a continuation of parent application Ser. No. 803,166 filed Feb. 28, 1969, now abandoned.

This invention concerns electrochemical cells and more particularly cells which comprise electrode arrangements of the kind in which a mass of particles of conducting, or semi-conducting, particles is caused to be expanded to form a well defined fluidized bed of particles by upward flow of liquid through the bed, the liquid usually consisting, at least in part, of an electrolyte for the cell. The flow of liquid is controlled to counteract the force of gravity on the particles so that the particles become levitated. These particles continually move about and are brought into contact with a conducting member extending into the bed. If a potential is applied to the conducting member, the individual particles will become charged at each contact or possibly contact will be made with the conducting member through a number of particles in series, in which case each of the particles becomes charged at the same time. Each particle is therefore available to transfer its charge to effect part of a particular reaction taking place in the cell and this effectively extends the surface area of the conducting member. Since the total surface area of all of the particles in the mass is quite large even for a large particle size, then it is to be observed that the fluidized bed electrode provides an electrode of far greater area than the normal rod, plate or the like electrode. By this means it is possible to provide an electrode of large surface area within a comparatively small volume.

The formation of a fluidized bed of this kind for use as an electrode may be affected by arranging that the mass of particles is supported at the bottom of an electrode chamber. The upward flow of liquid, which will normally be electrolyte but may possibly consist of or include one or more reactants for a reaction within the electrochemical cell, is required to be substantially uniformly distributed over the horizontal cross-section of the chamber. In this fluidized bed electrode described in British Pat. No. 1,194,181 the base of the chamber is finely porous, i.e., it has a large number of small passageways therethrough so that liquid pumped to a compartment below the base is caused to flow into the chamber through these passages which even out the flow across substantially the whole of the cross-section of the chamber. The liquid flow can be controlled, for instance by regulating the pumping rate or by choice of porosity of the base, to provide a well-defined expansion of the bed of particles in the form of a fluidised bed of desired depth.

In such an arrangement, the perforate base of the electrode chamber, which base can be of a porous plastics material, also serves to support the mass of particles when they settle down on the base after the flow of liquid ceases upon shut-down of the cell. In this way the particles are retained in the electrode chamber for further use in the formation of another fluidized bed electrode when it is desired to use the cell once more, the electrode being set up simply by restoring the flow of liquid, possibly a different liquid depending upon the reaction required to be effected in the cell. It will be observed, however, that if there are very fine particles present, then there is the possibility of some of the finer particles becoming trapped in the pores of the base. In fact, there may be fine suspensions in the electrode, either formed during the reaction or present as impurities depending upon the reaction in the cell and the probability of such fine particles becoming lodged in the pores of the base can in some cases be high. There is the possibility therefore of the distributing properties of the base being gradually impaired during continual shutting-down and re-establishing of the electrode and the functioning of the electrode could be affected.

The present invention is directed to providing another method of forming a fluidized bed electrode which avoids this possibility. According to the invention, an alternative construction of the electrode chamber feed arrangements is provided which, while being free from the difficulty of clogging, still enables the mass of particles to be formed into a fluidized bed electrode within the electrode arrangement, if desired.

According to one aspect of the invention an electrode arrangement for an electrochemical cell comprises an electrode chamber, a bed of particles enclosed by said chamber, which chamber in use of the cell is adapted to permit liquid flow upwardly through the bed of particles substantially uniformly over horizontal cross-sections of the chamber, at least one side wall of said chamber comprising at least in part, a permeable or semi-permeable diaphragm, the chamber having a tapered bottom portion wherein horizontal cross-sections of the flow path for said liquid flowing through the chamber gradually increase to the full horizontal cross-sectional area of the chamber, the chamber being effectively closed at at its lower end, and an inlet into the electrode chamber adjacent the base of said tapered bottom portion, said inlet comprising a slot substantially longer in its horizontal dimension than in its vertical dimension, said slot opening into said bottom portion from the side thereof which is opposite the said wall comprising at least in part the permeable or semi-permeable diaphragm, said vertical dimension of the slot being small enough to prevent the majority of said particles contained within the chamber from passing out of the chamber through the slot when the upward flow of liquid ceases. Preferably said tapered bottom portion is wedge form and said slot at its junction with said wedge form extends substantially across the horizontal width of said wedge form.

According to another aspect of the invention, an electrode arrangement for an electrochemical cell comprises an electrode chamber having therein a multitude of electrically conducting or semi-conducting particles, said particles being in the form of a fluidised bed by action of liquid flowing upwardly through said chamber substantially uniformly over horizontal cross-sections of the chamber, the improvement which comprises providing said chamber with a lower portion of wedge form that tapers downwardly from the full cross-sectional area of the electrode chamber to the bottom of the lower portion and an inlet slot adjacent said bottom which slot enters into said lower portion from the side, said slot having a vertical dimension so narrow that it prevents the majority of said particles contained within said chamber from passing out of said chamber when said upward flow of liquid ceases upon shut-down of the cell.

Preferably there is at least one electric current conducting member positioned within said chamber, part at least of said member being at a level above the upper extension of said chamber lower portion. Said chamber lower portion may extend only to a part of the effective height of the fluidized bed of particles. Conveniently a tubular feed duck may be provided to feed liquid to said narrow slot and the junction between said duct and slot is then preferably shaped to provide a smooth transition from the duct to substantially the full width of said slot.

The size of the inlet slot need not be smaller than the diameter of the particles because the lowermost particles will almost certainly bridge themselves one against the other across the gap to support the remainder of the particles.

The reason for easing the change of cross-section of the feed duct for the liquid to the full width of the slot is to avoid excessive turbulence of the liquid at the point of entry to the electrode chamber. If there is difficulty in achieving bridging of the particles when the flow of liquid ceases, then reliance can be placed on a build-up of particles on part of the bottom of the tapering or wedge portion of the chamber and this will have a similar effect in preventing the remainder of the particles from leaving the chamber. If the slot is not at the bottom of the taper or wedge form, then the particles will tend to settle right at the bottom and then mount up until they close the slot. Since the dimensions of the slot can be made small enough it can be arranged that settling of the particles need not cause much of the particle content to pass into the slot. In any event, what particles may pass into the slot will almost immediately be returned to the chamber when the flow of liquid is restarted.

In order that the invention may be more clearly understood one embodiment thereof will now be described with reference to the accompanying drawings of which:

Figure 1:
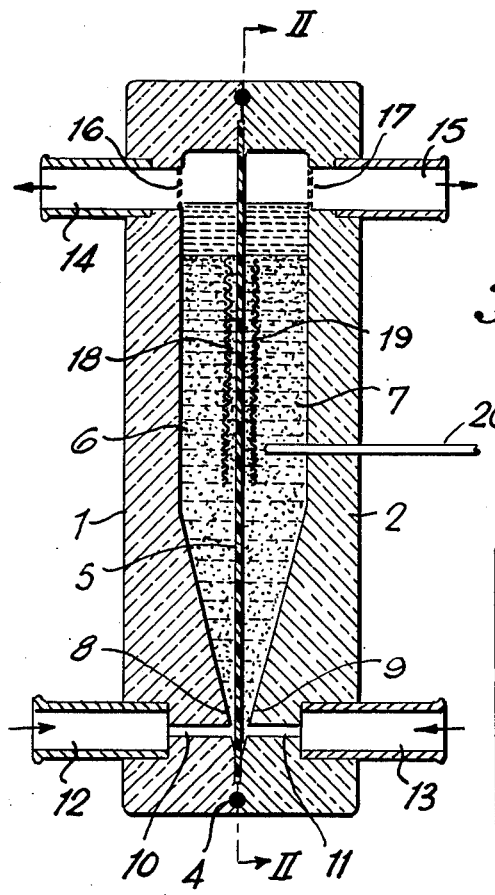
FIG. 1 is a vertical section through a cell in which both electrodes comprise fluidised particles.
Figure 2:
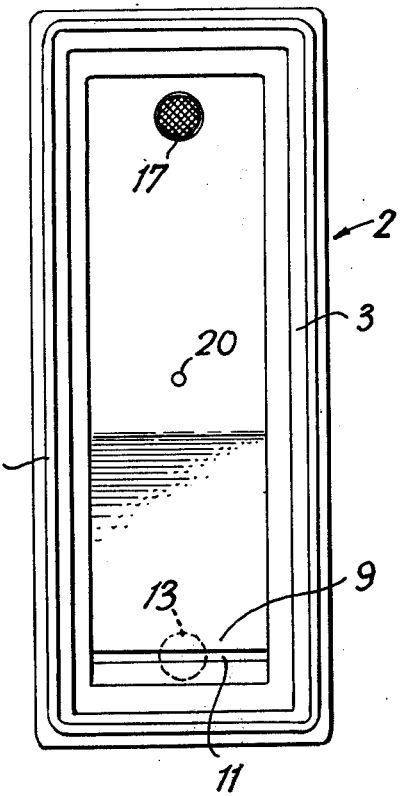
FIG. 2 is a view on the line II—II in FIG. 1.

In the drawings, the cell is shown as comprising two identical rectangular parts 1 and 2 which are formed with peripheral flat portions 3, each provided with grooves to receive an O-ring seal 4, arrangements being made for the two parts to be clamped together with a permeable or semi-permeable diaphragm 5 between them. Electrode chambers 6 and 7 are therefore formed, one at each side of the diaphragm. Of course, if desired, the diaphragm may itself be carried by a frame member of some kind and in that case the frame will be clamped between the two parts 1 and 2. It is obvious therefore that the one side wall of the electrode chamber need not be solely formed by the diaphragm; part of it could be formed by part of the frame.

At the upper end of each chamber is an outlet tube 14 (15) for electrolyte and this is screened with a gauze 16 (17), such as of nylon, to prevent loss of particles when they are fluidized; normally the top of the fluidized bed will not be caused to rise much above the level shown in either electrode chamber, but if it should happen that the flow of electrolyte somehow becomes excessive then the presence of the gauze 16 (17) will be effective to retain the particles of the bed. A current feeder member 18 (19) such as of non-corrosive wire mesh, is provided in each chamber; the member is not shown in full for the sake of clarity as regards the other features of the cell. Electrical connections are made with the feeders through the walls of the chambers and suitable arrangements will be sufficiently clear without need for further detail. A capillary probe 20 may be provided in known manner for control of potential and hence current in the cell; this probe is preferably adjustable relatively to the surface of the current feeder 19.

Arrangements, such as the provision of entry holes at the tops of the chambers, may need to be made for introducing the particles to the cell.

Typical dimensions of the inlet features are as follows:

| Inlet tubes | (12, 13) | — | 9.5 mm. diameter |
| Feeder slots | (10, 11) | — | 1.6 mm. deep by 22.0 mm. wide. |

Chambers with such inlet dimensions have been operated sucessfully with particles in the size range of 250–500 microns and would of course be suitable for particles of larger size. It is anticipated that bridging of the particles across the slot 10 (11) and the inlet 8 (9) would occur even with much finer particles.

If a pump is used to feed the liquid into the cell, it may be desirable to insert a valve between the pump and the cell to avoid the possibility of any back surge of liquid, when shutting down the pump, carrying some of the particles out of the cell.

On start-up of the cell, flow of electrolyte into each chamber is slowly increased and the particles will be forced from the inlets 8 and 9 up into the respective chambers, flaring of the taper sections causing greater flow velocities in these sections than in the upper fluidized sections of the chambers, so that most, if not all, particles are kept clear of the inlets during operation.

Operation of an electrode in accordance with the invention will be clear from the description given in the British patent referred to above.

It is not necessary from the point of the invention that the inlet arrangements should always comprise a plane form, nor that the chambers should always be of exactly rectangular section. The chambers could for example, be of semi-cylindrical form and the tapered sections part-conical. Other arrangements will also be evident.

We claim:

1. An electrode arrangement for an electro-chemical cell comprising an electrode chamber of rectangular horizontal cross-section, a bed of electrically conducting or semi-conducting particles enclosed by said chamber, which chamber in use of the cell is adapted to permit liquid flow upwardly through the bed of particles substantially uniformly over horizontal cross-sections of the chamber, electrically conducting means establishing electrical connection with said particles, at least one side wall of said chamber comprising, at least in part, a permeable or semi-permeable diphragm, the chamber having a tapered bottom portion wherein horizontal cross-sections of the flow path for said liquid flowing through the chamber gradually increase to the full horizontal cross-sectional area of the chamber, the chamber being effectively closed at its lower end, and an inlet into the electrode chamber adjacent the base of said tapered bottom portion, said inlet comprising a slot substantially longer in its horizontal dimension than in its vertical dimension extending substantially across the full horizontal width of said tapered portion, said slot opening into said tapered bottom portion from the side thereof which is opposite the said wall comprising at least in part the permeable or semi-permeable diaphragm, said vertical dimension of the slot being small enough to prevent the majority of said particles contained within the chamber from passing out of the chamber through the slot when the upward flow of liquid ceases.

2. An electrode arrangement as claimed in claim 1, wherein said tapered bottom portion is wedge form.

3. An electro-chemical cell comprising at least one electrode arrangement as claimed in claim 1.

4. An electrode arrangement for an electro-chemical cell comprising an electrode chamber of rectangular horizontal cross-section having therein a multitude of electrically conducting or semi-conducting particles and electrically conducting means establishing electrical connection with said particles, said particles being in the form of a fluidized bed by action of liquid flowing upwardly through said chamber substantially uniformly over horizontal cross-sections of the chamber, the improvement which comprises providing said chamber with a lower portion of wedge form that tapers downwardly from the full cross-sectional area of the electrode chamber to the bottom of the lower portion and an inlet slot adjacent said bottom which slot enters into said lower portion at the side, said slot extending substantially across the full horizontal width of said lower portion and having a vertical dimension so narrow that it prevents the majority of said particles contained within said chamber from passing out of said chamber when said upward flow of liquid ceases upon shut-down of the cell.

5. An electrode arrangement as claimed in claim 4, wherein said electrically conducting means comprises at least one electric current conducting member positioned within said chamber, part at least of said member being at a level above the upper extension of said chamber lower portion.

6. An electrode arrangement as claimed in claim 4, wherein said chamber lower portion extends to only a part of the effective height of the fluidized bed of particles.

7. An electrode arrangement as claimed in claim 4, wherein a tubular feed duct is provided to feed liquid to said slot and the junction between said duct and slot is shaped to provide a smooth transition from the duct to substantially the full width of said slot.

8. An electro-chemical cell comprising at least one electrode arrangement as claimed in claim 4.

* * * * *